UNITED STATES PATENT OFFICE.

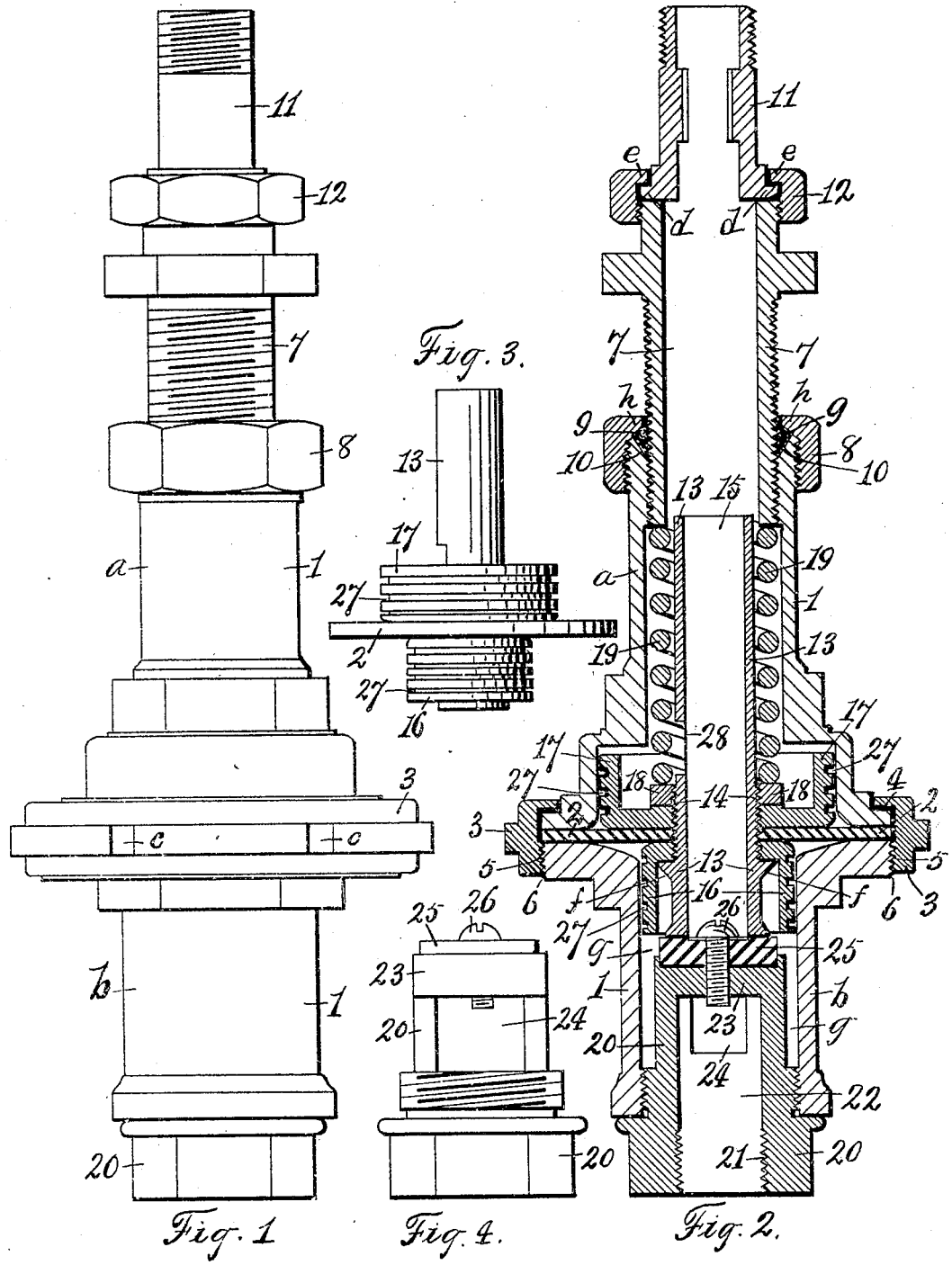

WALTER H. BICE, OF MAPLE LODGE, ONTARIO, CANADA, ASSIGNOR OF ONE-THIRD TO ALFRED WESTMAN AND ONE-SIXTH TO WILLIAM R. COLBY, BOTH OF LONDON, ONTARIO, CANADA.

AUTOMATIC PRESSURE-REDUCTION VALVE.

962,737.  Specification of Letters Patent.  Patented June 28, 1910.

Application filed November 10, 1909. Serial No. 527,324.

*To all whom it may concern:*

Be it known that I, WALTER H. BICE, a subject of the King of Great Britain, and a resident of Maple Lodge, in the county of Middlesex, in the Province of Ontario, Canada, have invented a new and useful Automatic Pressure-Reduction Valve, of which the following is a specification.

This invention relates to a valve used in reducing fluid pressure, and it consists of the improved construction and novel combination of parts of the same as will be hereinafter first fully set forth and described and then pointed out in the claims.

Reference being had to the accompanying drawings forming part of this specification, wherein:—

Figure 1 is a side view of an automatic pressure reduction valve embodying my invention. Fig. 2 is a vertical central sectional view of Fig. 1. Fig. 3 is a side view of the adjustable valve. Fig. 4 is a side view of a stationary valve cage.

In the accompanying drawings:—The numeral 1 indicates the hollow body of the valve consisting of two sections, *a*, and *b*.

2 indicates a diaphragm made of rubber, copper or other suitable metal, or combination of metals, the outer edges of which are held between the portions, *a*, and *b*, of the hollow body 1, as shown.

3 indicates a screw coupling provided with the notches *c*, with an internal annular flange 4 which engages with the section, *a*, of the hollow body 1, with an internal screw thread 5 which engages with the external screw thread 6 on the section, *b*, of the body 1, as shown, to firmly secure the portions, *a*, and *b*, of the body 1 together.

7 indicates a compression plug screwed or otherwise secured in the section, *a*, of the hollow body 1; 8 a packing nut provided with an internal flange, *h*, and screwed or otherwise secured on the section, *a*, of the hollow body 1, the flange, *h*, compressing the packing, 9, in the packing box 10, between the compression plug 7 and the end of the section, *a*, of said hollow body 1, as shown.

11 indicates a union provided with the annular flange *d*, and 12 a union nut provided with an annular flange, *e*, which engages with the annular flange, *d*, of the union 11 to screw or otherwise secure the union 11 to the compression plug 7.

13 indicates a hollow tube provided with the shoulder, *f*, and with a screw thread 14, on the outside, and this tube 13 is provided with a central opening 15 throughout, as shown.

The cup or plate 16 is first placed on the shoulder, *f*, on the outside of the tube 13, the diaphragm 2, is then placed on this cup or plate 16, the cup or plate 17 is then placed on the diaphragm 2 and the whole are tightened together by the screw nut 18 engaging with the screw thread 14 and binding on the cup or plate 17. In this case there is a cup or plate held by the tube 13 on each side of the diaphragm 2.

19 is a coil spring which surrounds the hollow tube 13 and abuts against the end of the compression plug 7 at one end and the screw nut 18 at the other end.

20 is a cage screwed or otherwise secured in the section *b*, of the hollow body 1, and this cage 20 is provided with an internal screw thread 21 for attachment to a pipe connection not shown. This cage 20 has an inner passage 22, up to the closed top 23, and this cage 20 also has openings 24 which extend from the inner passage 22 of said cage 20 to the inner passage, *g*, of the section, *b*, of the hollow body 1. When this cage 20 is secured in place it is stationary, and is provided with a stationary valve seat 25 on top, which is secured thereto by the screw 26, and against this stationary valve seat 25 the tube 13 abuts when in its lowered position as shown in Fig. 2.

If desired the cups or plates 16 and 17 may be provided with grooves 27 to provide a liquid packing, when metal, composition of metal, or other suitable material is used, but in cases where rubber cups or plates 16 and 17 are used a metal expander is preferably employed.

28 is an opening in the side of the tube 13 to permit the fluid to pass out of said tube 13 above the plate or cup 17 to assist in closing the pipe 13 on the stationary valve seat 25.

The operation is as follows:—The tube 13 with the plates or cups 16 and 17, diaphragm 2 and spring 19 are inserted in and between the two sections, *a*, and *b*, of the hollow body 1 which are joined together by the screw coupling 3.

As shown in Fig. 2 the end of the compression plug 7 presses on the coil spring 19, according to the pressure required, and the end of this spring 19 presses on the nut 18 which holds the end of the tube 13 tight against the stationary valve seat 25, this closes the passage 15 in said tube 13 until the fluid entering the passage 22 in the cage 20, passes out through the openings 24 into the passage, g, in the lower section b, of the hollow body 1, against the cup or plate 16. The pressure of the fluid therein against said cup 16, raises the latter as well as the central portion of the diaphragm 2, the cup 17, the tube 13, and compresses the spring 19. This raises the tube 13 from the stationary valve seat 25 and permits the fluid to pass through the passage 15 in the tube 13, and through the compression plug 7 to any point desired. As this fluid passes up this passage 15 in the tube 13, a portion of this fluid passes out of this tube 13 through the opening 28 on to the plate or cup 17. When the pressure is increased on this cup 17 to a given point, it together with the expansion of the spring 19, automatically lowers the plate or cup 17, the central part of the diaphragm 2, the plate or cup 16 and the tube 13, until the lower part of the latter abuts against the stationary valve seat 25, and stops the flow or passage of the fluid until the pressure in the passage 15 is again released when the same operation before described is repeated.

Having thus described my invention, I claim:

1. An automatic pressure reduction valve, comprising a casing, a spring-pressed sliding tubular valve mounted therein, a diaphragm secured thereto and to said casing, cups arranged above and below said diaphragm, and a stationary valve seat provided with openings therein to be engaged by said sliding valve.

2. An automatic pressure reduction valve, comprising a casing formed of an upper and a lower section secured together, a sliding valve mounted therein, a diaphragm secured thereto and to said casing, cups arranged above and below said diaphragm, a stationary valve seat mounted in the lower end of said casing and to be engaged by said sliding valve, said sliding valve and valve seat provided with transverse ports.

3. An automatic pressure reduction valve, comprising a casing, a sliding tubular valve mounted therein, a stationary valve mounted in the lower end of said casing and provided with transverse openings, a diaphragm secured in said casing intermediate the ends of said tubular valve and connected thereto, cups arranged above and below said diaphragm, said diaphragm operated to be raised and lowered by the pressure in said casing.

4. An automatic pressure reduction valve comprising a casing, a tubular valve mounted therein, a stationary valve seat secured in said casing and provided with transverse openings therein, a diaphragm, cups arranged above and below said diaphragm, and a single means for securing said diaphragm and cups to said tubular valve.

In testimony whereof, I have signed in the presence of the two undersigned witnesses.

WALTER H. BICE.

Witnesses:
P. J. EDMUNDS,
S. HARDY.